United States Patent
Zach

[11] 3,895,652
[45] July 22, 1975

[54] DIAMETRICALLY EXPANSIBLE COIL SPRING CONDUIT PLUG

[76] Inventor: Roger G. Zach, 4144 S. Maple, Berwyn, Ill. 60402

[22] Filed: Jan. 11, 1974

[21] Appl. No.: 432,567

[52] U.S. Cl. .................................. 138/89; 15/104.2
[51] Int. Cl. ............................................ B65d 59/02
[58] Field of Search ....................................... 138/89; 4/255–257, 295; 166/135–137, 211, 215; 251/181–183; 15/104.2

[56] References Cited
UNITED STATES PATENTS

| | | |
|---|---|---|
| 161,941 | 4/1875 | Fischer ................................. 138/40 |
| 644,794 | 3/1900 | Cummings .......................... 15/104.2 |
| 2,184,634 | 12/1939 | Crickmer et al. ................. 138/89 X |
| 3,444,898 | 5/1969 | Caple ..................................... 138/89 |

Primary Examiner—Henry K. Artis
Assistant Examiner—James E. Bryant, III
Attorney, Agent, or Firm—Robert M. Ward

[57] ABSTRACT

A plumber's tool for preventing leakage of water into a conduit during repair or installation comprising a diametrically expansible coil spring disposed in a sealed rubber boot, such that when the ends of the coil spring thereof are twisted by handles connected thereto the coil spring expands or contracts in diameter binding the rubber boot against the walls of the conduit to create a seal.

4 Claims, 2 Drawing Figures

DIAMETRICALLY EXPANSIBLE COIL SPRING CONDUIT PLUG

BACKGROUND OF THE INVENTION

The present invention relates generally to plumber's tools. More specifically it relates to a tool for plugging a conduit prior to making repairs or installations along a pipeline.

A problem commonly faced by plumbers or others who work on lead pipe or other conduits is the difficulty experienced in soldering or wiping a joint when there is water leaking down the pipe into the working area. Heretofore, it has been necessary either to shut off completely the flow of water in the conduit prior to making the repair or installation in order to prevent water from leaking into the working area. This solution to the problem has not proved to be entirely satisfactory because this procedure requires an inordinate amount of time to accomplish, as well as the fact that water is free to drip down the length of the conduit from the position where the water has been shut off back to the working area. This latter situation has been found to be quite objectionable.

The prior art has attempted to solve this problem with a variety of devices. Inflatable bladder-like conduit stoppers have been employed to stop the flow of fluid through a conduit. Oftentimes, however, these bladder-like devices did not achieve a seal sufficient to prevent the flow of fluid down the conduit into the working area. An improved bladder-like conduit plug reinforced with thin metal strips disposed in expansible relation did not substantially improve the performance of this type of conduit plug. Another attempt to solve the problem was the use of a conduit plug having a resilient, deformable, hollow body portion whose axial diameter could be varied by movement of an axially disposed rod therein. Other attempts to solve the problem have been conduit plugs expandable by means of the abutment of a screw threaded connection between two expandable cylindrical bodies. A further attempt to solve the problem has been a conduit plug comprising a split ring element, the ends of which are connected to means which may be forced apart or contracted in order to expand or contract the rings or parts thereof. These devices all have proved to be unsatisfactory for the average plumber to purchase and use. Either they have not been effective in shutting off the flow of fluid down the conduit or their cost has been prohibitive.

SUMMARY OF THE INVENTION

The present invention provides a conduit plug having a diametrically expansible coil spring enclosed in a sealed rubber boot to prevent water from contacting the coil spring and causing rust or corrosion thereof, as well as to provide a water-tight seal between the coil spring and the conduit wall. The coil spring has attached to one of its ends a first rod which extends through the center of the coil spring. A second rod extends from the other end of the coil spring, with the two rods disposed in substantially parallel relation. Connected to the first rod is a tube having a handle attached thereto. The second rod is then disposed inside the tube and has a crank attached thereto, such that the rods may be rotated with respect to each other by holding the handle and twisting the crank. When the rods are rotated with respect to each other in the proper direction, the coil spring is expanded diametrically causing the rubber boot to bind against the conduit wall to effect a water-tight seal. A lever connected to either one of the rods is lowered and permitted to contact a projection attached to the other rod whereby counter-rotation of the rods is prevented.

The coil spring may be made of steel, plastic or other material having sufficient spring-like qualities. The boot sealingly enclosing the coil spring may be made of rubber or other resilient material. The tube, handle, crank, projection and lever may be made of metal or polymeric material.

Use of the present invention considerably reduces the problems associated with prior art conduit plugs. The device may be inexpensively produced due to the small number and lack of complexity of the moving parts thereof. Furthermore, its low cost places it within the budget of the average plumber. Additionally, its small number of moving parts and relative simplicity of design make it easy to use and operate. Also, it may be installed and disinstalled quickly, permitting the plumber to utilize his time more efficiently.

Other features and advantages are inherent in the present invention as disclosed and claimed, or will become apparent to those skilled in the art from the following detailed description in conjunction with the accompanying drawings.

DETAILED DESCRIPTION OF PREFERRED EMBODIMENTS

Figure 1:
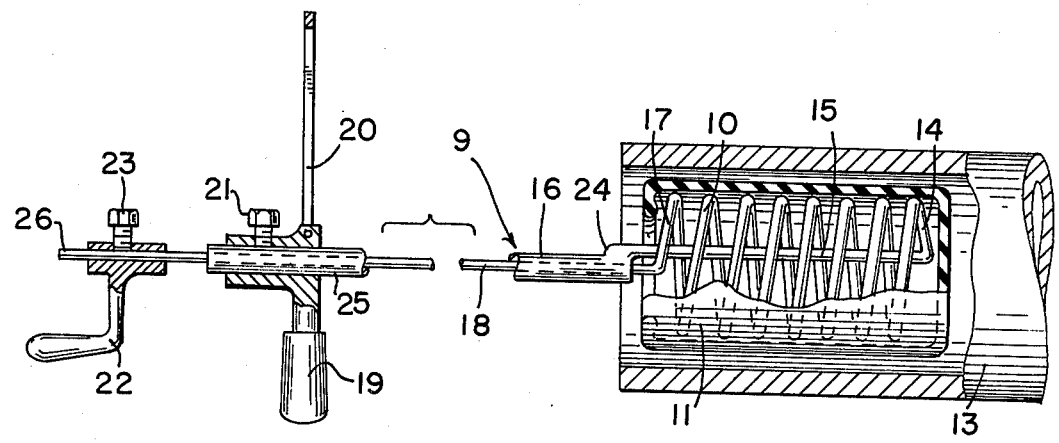
FIG. 1 is a framented side elevation of the present invention in its unexpanded position inside a conduit.

Referring to FIG. 1, the conduit plug shown generally at 9 has a diametrically expansible coil spring 10 disposed inside a sealingly enclosed rubber boot 11. The device is shown positioned inside fragmented conduit 13. Rubber boot 11 is also shown in fragmented section so that coil spring 10 may be seen. Attached to the first end 14 of coil spring 10 is a first rod 15 which extends through the center of coil spring 10 and has attached at terminal portion 24 thereof tube 16. Attached to the second end 17 of coil spring 10 is a second rod 18 which is disposed through the center of tube 16. Attached to proximate end 25 of tube 16 is handle 19 and lever 20 secured to proximate end 25 by bolt 21. Attached to the proximate end 26 of second rod 18 is a crank handle 22 which is secured to proximate end 25 of second rod 18 by bolt 23. The device, as shown inserted into conduit 13 in FIG. 1, is in the unexpanded position in which it would be when first inserted into a conduit which needs to be plugged.

Figure 2:
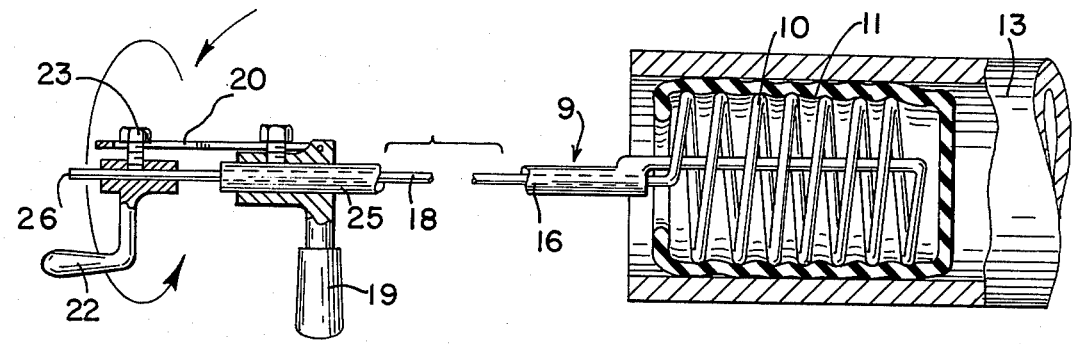
FIG. 2 is a fragmented side elevation of the present invention shown in expanded position inside a conduit.

Referring to FIG. 2, conduit plug 9 is shown in expanded position plugging conduit 13 as in actual use. Conduit plug 9 is operated by first inserting coil spring 10 enclosed in rubber boot 11 into the conduit 13 to be plugged. The user then grasps handle 19 in one hand and turns crank 22 in a counter clockwise direction with the other hand. Next, with the index finger of the hand holding handle 19, lever 20 is moved from the upright position shown in FIG. 1 to the downward position as shown in FIG. 2. Crank 22 and handle 19 may then be released with second rod 18 and tube 16 counterrotating until the rotation is stopped when bolt 23 impinges upon lever 20.

The foregoing detailed description has been given for clearness of understanding only, and no unnecessary limitations are to be understood therefrom as modifications will be obvious to those skilled in the art.

What is claimed is:

1. A conduit plug comprising:
   diametrically expansible coil spring means;
   means for sealingly enclosing said coil spring means and binding said coil spring means firmly against the walls of said conduit; and
   means for securing said coil spring in diametrically expanded position such that said coil spring means plugs the conduit by binding against said means for sealingly enclosing said coil spring means and binding said coil spring means.

2. The conduit plug of claim 1 wherein said means for securing said coil spring in diametrically expanded position comprises:
   a first rod, said first rod connected to one end of said coil spring means and extending through the center of said coil spring means;
   a second rod extending from the other end of said coil spring means, said first and second rods disposed in substantially parallel relation;
   a tube, said tube connected to said first rod and surrounding said second rod;
   a handle attached to said tube;
   means for rotating said second rod with respect to said first rod; and
   means for preventing counterrotation of said second rod and said tube with respect to each other after said rods have first been rotated to expand diametrically said coil spring means and bind said enclosing means against the walls of said conduit.

3. The conduit plug as claimed in claim 2 wherein said means for preventing counterrotation comprises:
   a lever connected to said first rod;
   a projection connected to said second rod, whereby after the coil has been diametrically expanded said lever may be lowered to contact said projection and thereby prevent counterrotation of said rods.

4. The conduit plug of claim 1 wherein said means for sealingly enclosing said coil spring means and binding said coil spring means against the walls of said conduit comprises:
   a rubber boot.

* * * * *